United States Patent [19]

Blackburn et al.

[11] 4,158,572

[45] Jun. 19, 1979

[54] PROCESS OF PRODUCING A PHTHALOCYANINE PIGMENT

[75] Inventors: John B. Blackburn, Beith; Alexander M. Irvine, Dean Park; Michael Sutcliffe, Glasgow; George McLaren, Houston, all of Scotland

[73] Assignee: Ciba-Geigy Corporation, Ardsley, N.Y.

[21] Appl. No.: 840,886

[22] Filed: Oct. 11, 1977

[30] Foreign Application Priority Data

Oct. 15, 1976 [GB] United Kingdom ............... 42858/76

[51] Int. Cl.² ................................................. C08J 3/00
[52] U.S. Cl. ........................... 106/288 Q; 106/308 Q; 106/309; 106/292; 106/301
[58] Field of Search ............... 106/288 Q, 309, 308 Q; 260/314.5

[56] References Cited

U.S. PATENT DOCUMENTS

| | | | |
|---|---|---|---|
| 2,816,115 | 12/1957 | Howell | 106/309 |
| 3,017,414 | 1/1962 | Minnich et al. | 106/309 |
| 3,523,030 | 8/1970 | Malin et al. | 106/309 |
| 3,758,321 | 9/1973 | Santemauro et al. | 106/288 Q |
| 3,775,149 | 11/1973 | Langley et al. | 106/308 Q |

*Primary Examiner*—Patrick Garvin
*Assistant Examiner*—J. V. Howard
*Attorney, Agent, or Firm*—Joseph F. DiPrima

[57] ABSTRACT

A process of producing a phthalocyanine pigment comprising dry grinding a crude phthalocyanine, stirring the ground product with an aqueous medium containing a surfactant and isolating the pigmentary product which, when dispersed into surface coating media, provide colorations having high brilliance and depth of shade.

14 Claims, No Drawings

PROCESS OF PRODUCING A PHTHALOCYANINE PIGMENT

The present invention relates to a process for producing a phthalocyanine pigment in an aqueous medium.

In the case of pigments intended for use in colouring surface coating media, e.g. paints, lacquers and inks, the physical characteristics of the pigment assume particular importance The physical characteristics are so important in these substrates because the physical properties control to a large degree the colouristic properties of the pigment in the surface coating.

A major problem associated with the use of pigments in surface coating media, is that such media contain organic solvents which can have a disadvantageous effect on the crystal form as well as the degree of aggregation of the pigment particles. For instance, in the case of phthalocyanine pigments, these pigments in their true crude form (ex vat) are in the $\beta$-crystal form, are of large particle size (25 to 50 microns) and have a surface area of about $5m^2/g$.

The particle size of the crude $\beta$-phthalocyanine pigment must be reduced, e.g. by grinding, before it can be employed as a pigment in surface coating media. After submitting the true crude $\beta$-phthalocyanine to a comminution process such as grinding there is obtained a mixture of $\alpha$- and $\beta$-phthalocyanine having a reduced particle size, e.g. a size in the range of from 0.01 to 1 micron, but which is still highly aggregated so that the surface area of the pigment is still low i.e. about $5m^2/g$. The longer the comminution process is continued, the higher is the conversion of $\beta$-form phthalocyanine into the $\alpha$-crystal modification. However, the higher energy form $\alpha$ modification is unstable when exposed to organic solvents such as those used in surface coatings, whereupon it reverts to the more stable $\beta$-form. Such a ground $\alpha$-/$\beta$-product is normally termed a ground crude $\alpha$-form pigment. In order to convert unstable $\alpha$-form to stable $\beta$-form phthalocyanine and to produce a pigment of a quality acceptable for paints, inks and plastics, it has previously been necessary to subject the ground crude product to a further treatment with an organic solvent, as illustrated e.g. in U.S. Pat. No. 2,857,400.

Such solvent treatments or after-treatments, however, do have the disadvantage that the organic solvent used is expensive and must also be removed and recovered after use, resulting in further expenditure in time and plant.

We have now found that ground crude phthalocyanine pigment may be converted into pure $\beta$-phthalocyanine by a process which does not involve a treatment with an organic solvent.

According to the present invention, there is provided a process of producing a phthalocyanine pigment comprising
(a) dry grinding crude phthalocyanine
(b) stirring the product from stage (a) with an aqueous medium containing a surfactant and
(c) isolating the pigmentary product.

The crude phthalocyanine starting-material for stage (a) may be a metal-free or metal-containing phthalocyanine and may be optionally substituted with halogen atoms especially chlorine and/or bromine atoms. If the phthalocyanine contains metal atoms these metal atoms may be cobalt-, zinc-, cadmium-, nickel- or other transition metal atoms, but the preferred starting-material is $\beta$-form copper phthalocyanine as obtained directly from its synthesis.

In stage (a), the dry grinding treatment applied to the phthalocyanine material may be effected with or without the use of a salt e.g. calcium chloride, sodium chloride, sodium acetate, sodium sulphate or other inorganic or organic salt. The dry grinding treatment is conveniently effected in a ball mill for a sufficient length of time to obtain a ground crude phthalocyanine having a mean particle size in the range of from 0.01 to 1 micron, preferably from 0.03 to 0.5 micron. Normally, a grinding time of from 4 to 12 hours is adequate for this purpose.

Preferably the surfactant used in step (b) of the process of the invention is a non-ionic surfactant. Preferred non-ionic surfactants are homo- and copolymers of alkoxylated -acids, -alcohols, -phenols and -amines, e.g. poly(ethoxylated) C1–C12 alkyl phenols such as nonyl phenol, poly(ethoxylated) C10–C18 alcohols such as cetyl alcohol, poly(ethoxylated) C12–C18 alkyl amines such as coco-amine or tallow amine, poly(ethoxylated) C10–C18 aliphatic acids such as stearic acid and poly(ethoxylated) C10–C18 aliphatic acid amides such as hydrogenated tallow amide. Typical surfactants which are useful in the process of the present invention are alkyl phenols such as octyl and nonyl phenols, fatty alcohols e.g. cetyl-, stearyl- and oleyl alcohols, or glyceryl esters condensed with 5 to 50 moles of alkylene oxide.

Particularly preferred nonionic surfactants for use in stage (b) of the process of the present invention are ethoxylated alkyl phenols.

The nonionic surfactant may contain anionic or cationic groups in addition to nonionic groups such as alkoxy groups, provided that the total molecule exhibits a net non-ionic character.

The amount of surfactant used is preferably from 1% to 30%, especially from 2% to 20%, more especially from 5% to 15% by weight, based on the weight of phthalocyanine starting material.

Stage (b) of the present invention is preferably effected under conditions of good agitation, such as those which are attainable using a high-speed stirrer having a maximum speed within the range of from 4000 to 8000 revolutions per minute. Alternatively, if step (b) is conducted at the temperature at which the reaction mixture of step (b) refluxes, the agitation of the mixture caused by the refluxing may obviate the need for high speed stirring.

Desirably, stage (b) of the process of the invention is effected at an elevated temperature e.g. at a temperature within the range of from 25° to the boil, advantageously at a temperature within the range of from 70° C. to the boil.

For the production of a pigment composition suitable for aqueous application systems e.g. emulsion paints, a preferred procedure involves complexing the non-ionic surfactant, which is used to convert $\alpha/\beta$ CuPc to $\beta$ CuPc, with an ionic surfactant such as a polymeric carboxylic acid e.g. a polyacrylic or polymethacrylic acid. The complex formation may be effected by adding a solution of the ionic surfactant, e.g. of the polymeric carboxylic acid or a water-soluble salt thereof e.g. an alkali metal or ammonium salt thereof, to the slurry formed by mixing the pigment and the non-ionic surfactant solution; and reducing the pH value of the mixture by the addition of acid e.g. HCl, $H_2SO_4$, $H_3PO_4$ or acetic acid, until the slurry is flocculated to an extent sufficient to allow isolation of the pigment by conventional filtration. The pH value to which the slurry has to be reduced is usually below 3.5, preferably within the range of 1.0 to 2.5.

Further details of the nature and mode of preparation of the surfactant complexes used in this preferred embodiment of the process of the invention are described in our Belgian Patent No. 834,829.

The pigment product so obtained may be washed free from salts soluble in water, preferably using acidified water to prevent breakdown of the surfactant complex.

After drying e.g. in a conventional drying oven maintained, for instance, at a temperature in the range of from 40° to 70°, there is obtained a pigment composition which is easily dispersible in an aqueous emulsion paint with only low shear stirring e.g. stirring with a paddle stirrer.

It may be advantageous to add, during step (b) of the process of the present invention, a proportion of one or more agents known to improve the applicational properties of a pigment in other surface coatings. Examples of such agents include resin, rosin amines, zinc calcium resinates and, amines, or derivatives thereof, preferably aliphatic amines, amine salts or amine oxides having from 1 to 20 carbon atoms. Any amines used may be primary, secondary or tertiary amines. Preferred amines are C12 to C20 alkylamines e.g. oleylamine, stearylamine, 3-octadecylaminopropyl amine or 3-(2'-pentadecylamino)propylamine, optionally in the form of their carboxylic acid salts e.g. their acetates or oleates.

The proportion of any improving agent added during stage (b) is desirably within the range of from 1% to 40%, especially from 2% to 15% by weight, based on the total weight of dry pigment.

The final isolation step, stage (c) of the process of the present invention may be carried out e.g. by acidifying the mixture, filtering off the solid pigmentary material and, desirably washing it free from water-soluble materials, prior to drying it e.g. at a temperature within the range of from 40° to 70° C.

The pigments obtained according to the process of the present invention are produced without expenditure on organic solvents or environmental pollution due to the use of such solvents. Moreover, when dispersed into surface coating media such as paints, lacquers and inks, especially aqueous surface coating media, the pigments provide colourations having high brilliance and depth of shade.

Accordingly, the present invention also provides a composition comprising a surface coating medium and a pigmenting proportion of a pigment produced by a process according to the invention.

The following Examples further illustrate the present invention. Parts and percentages shown therein are by weight unless otherwise stated.

EXAMPLE 1

6 parts Empilan NP.9 (nonylphenol-ethoxylated) are dissolved in 350 parts cold water with stirring. 60 parts crude phthalocyanine which has been ground in a ball-mill with steel balls for eight hours is then added to the surfactant solution under conditions of good agitation e.g. using a Silverson L2R high speed stirrer (max. speed is about 6,000 revs./min.). The pigment suspension is heated under high speed stirring to 95° C. and this temperature held for 90 min. at pH 8.5 (pH adjustment by addition of dil.NaOH solution). 120 parts of a 5% w/w solution of Staybelite (ex Hercules Powder Co.) resin in dil.KOH is then run in, followed by sufficient calcium chloride solution to precipitate the resin. The slurry is then acidified to pH2 with dil.HCl. stirred ½ hour under conventional stirring conditions, filtered, washed free of soluble salts, and dried (at 50°-60° C.).

Similar products were obtained when Empilan NP.9 was replaced by one of the following surfactants:

(a) ethoxylated castor oil
(b) ethoxylated synthetic C13-C15 linear primary alcohol.

The pigment compositions so obtained are particularly suitable for use in oil inks and non-aqueous paints.

EXAMPLE 2

750 parts crude β-form phthalocyanine blue is ground with 65 parts phthalimide to give approximately 60% α-form pigment, using a ball-mill. The powder produced is stirred into 1500 parts water containing 24 parts flake caustic soda and 157.5 parts Synperonic NP15 (an ethoxylated alkyl phenol from ICI Ltd.) Mixing is continued on a high-speed mixer, e.g. a Silverson L2R, for 2.5 hours, maintaining the temperature at 95°-100° C. by the injection of steam. A solution is then added which consists of 514 parts of a 35% solution in water of potassium polymethacrylate (Vinapol 1640 ex Vinyl Products) and 22.5 parts of Supronic E800 (an ethylene oxide/propylene oxide block co-polymer ex ABM Chemicals Ltd) all in 800 parts water.

The slurry is then acidified with dilute hydrochloric acid to pH 1 then filtered and washed with water acidified with hydrochloric acid to pH2. The filter cake is then dried to yield a pigment composition which is readily dispersible in aqueous emulsion paint.

EXAMPLE 3

87.5 parts crude (β-form) phthalocyanine is ground with 11.5 parts anhydrous calcium chloride, 0.8 parts diethylaniline, and 0.4 parts glycerol monooleate to give approximately 60% α-form pigment, using a ball mill.

The powder is stirred into 600 parts water containing 8.75 parts Synperonic NX (an ethoxylated alkylphenol from ICI Ltd). Mixing is continued on a high-speed mixer, e.g. a Silverson L2R, for 1.75 hours, maintaining the temperature at 95°-100° C. by the injection of steam. A further 7 parts Synperonic NX dissolved in 20 parts water are then added, and mixing continued for a further 0.25 hours at 95°-100° C. A solution is then added which consists of 45 parts of a 35% solution in water of potassium polymethacrylate (Vinapol 1640 ex Vinyl Products) in 150 parts water.

The slurry is then acidified with dilute hydrochloric acid to pH 1, then filtered and washed with water acidified with hydrochloric acid to pH 2. The filter cake is then dried to yield a pigment composition which is readily dispersible in aqueous emulsion paint.

EXAMPLE 4

54 parts of ground copper phthalocyanine powder, obtaned as described in Example 2 are stirred in 500 parts of water containing 2 parts of sodium hydroxide flake and 10.5 parts of Synperonic NP15 (an ethoxylated alkyl-phenol).

The resulting slurry is heated to reflux and maintained at reflux temperature with conventional paddle stirring until the pigment is converted to 100% β-form (time required approximately 2½ hours). The slurry is then cooled to 65° C. A solution is then added which consists of 34.5 parts of a 35% solution in water of Vinapol 1640 (the potassium salt of polymethacrylic acid) and 1.5 parts of Superonic E.800 (an ethylene oxide/propylene oxide block co-polymer) all in 56 parts of water. The slurry is stirred for 15 minutes and then acidified with a solution of 22 parts of hydrochloric acid in 22 parts of water. The temperature of the mixture is allowed to fall to 55° C.

The slurry is then filtered and washed with a solution of 8.16 parts citric acid in 16,000 parts water. The filter cake is dried to yield a pigment composition which is readily dispersible in an aqueous emulsion paint.

EXAMPLE 5

54 parts of ground copper phthalocyanine powder, obtained as described in Example 2 are stirred into 800 parts of water containing 10.5 parts of Texofor D30 (an ethoxylated glycerol ester). Mixing is continued on a high-speed mixer; viz. a Silverson L2R, for 2.5 hours, maintaining the temperature at 95°–100° C. by the injection of steam. A solution is then added which consists of 34.28 parts of a 35% solution of Vinapol 1640 (potassium polymethacrylate) and 1.5 parts of Supronic E.800 (an ethylene oxide/propylene oxide block co-polymer) all in 56 parts of water. Mixing is continued on a high-speed mixer for 15 minutes and then the high-speed mixer is replaced by a conventional paddle stirrer. The slurry is acidified with dilute hydrochloric acid to pH 1.5. Stirring is continued for half an hour.

The slurry is then filtered and washed with a solution of citric acid as described in Example 4. The filter cake is dried to yield a pigment composition which is readily dispersible in an aqueous emulsion paint.

EXAMPLE 6

54 parts of ground copper phthalocyanine powder, obtained as described in Example 2 are stirred in 800 parts of water containing 10.5 parts of Synperonic BD.100 (a mixture of two ethoxylated long chain primary alcohols). Mixing is continued using a conventional paddle stirrer and the pigment slurry is heated at reflux temperature for three hours. A solution is then added which consists of 34.28 parts of a 35% solution in water of Vinapol 1640 (potassium polymethacrylate) and 1.5 parts of Supronic E.800 (an ethylene oxide/propylene oxide block copolymer) all in 56 parts of water. The slurry is stirred for fifteen minutes and then acidified and worked up as described in Example 5 to yield a pigment composition which is readily dispersible in an aqueous emulsion paint.

We claim:

1. A process of producing a β-phthalocyanine pigment comprising
    (a) dry grinding a crude phthalocyanine to obtain an α-/β-phthalocyanine,
    (b) stirring the product of stage (a) with an aqueous medium, in the absence of an organic solvent, and wherein said aqueous medium contains a surfactant exhibiting a net non-ionic character or said surfactant complexed with an ionic surfactant, to convert said α-/β-phthalocyanine to the β-phthalocyanine form and
    (c) isolating the resulting β-phthalocyanine pigmentary product.

2. A process as claimed in claim 1 wherein the starting material is β-form copper phthalocyanine as obtained directly from its synthesis.

3. A process as claimed in claim 1 wherein the dry grinding in stage (a) is effected in a ball mill for a sufficient length of time to obtain a crude ground phthalocyanine having a mean primary particle size in the range of from 0.01 to 1 micron.

4. A process as claimed in claim 1 wherein the surfactant in step (b) is a non-ionic surfactant.

5. A process as claimed in claim 4 wherein the non-ionic surfactant is a homo- or copolymer of alkoxylated -acids, -alcohols, -phenols or -amines.

6. A process as claimed in claim 5 wherein the surfactant is a
poly(ethoxylated) C1–C12 alkyl phenol, a
poly(ethoxylated) C10–C18 alcohol, a
poly(ethoxylated) C12–C18 alkyl amine, a
poly(ethoxylated) C10–C18 aliphatic acid or a
poly(ethoxylated) C10–C18 aliphatic acid amine.

7. A process as claimed in claim 1 wherein the amount of surfactant used is from 1 to 30% by weight, based on the weight of the phthalocyanine starting material.

8. A process as claimed in claim 1 wherein the process of step (b) is effected at a temperature within the range of from 25° C. to the boil.

9. A process as claimed in claim 1 wherein the non-ionic surfactant which is used to convert α/β copper phthalocyanine to β copper phthalocyanine pigment is complexed with an ionic surfactant.

10. A process as claimed in claim 9 wherein the ionic surfactant is a polymeric carboxylic acid.

11. A process as claimed in claim 9 wherein the complex formation is effected by adding a solution of the ionic surfactant to the slurry formed by mixing the pigment and the non-ionic surfactant solution and reducing the pH value of the mixture by the addition of acid, until the slurry is flocculated to an extent sufficient to allow isolation of the pigment by filtration.

12. A process as claimed in claim 11 wherein the pH value to which the slurry is reduced is within the range of 1.0 to 2.5.

13. A process as claimed in claim 1 wherein there is added during step (b) one or more agents known to improve the applicational properties of a pigment.

14. A process as claimed in claim 1 wherein the stage (c) is effected by acidifying the mixture, filtering off the solid pigmentary material and washing it free from water-soluble materials prior to drying it.

* * * * *